US012090457B2

(12) United States Patent
Zhang

(10) Patent No.: US 12,090,457 B2
(45) Date of Patent: Sep. 17, 2024

(54) MIXING APPARATUS

(71) Applicant: CHANGXIN MEMORY TECHNOLOGIES, INC., Anhui (CN)

(72) Inventor: Feng Zhang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 353 days.

(21) Appl. No.: 17/668,699

(22) Filed: Feb. 10, 2022

(65) Prior Publication Data

US 2023/0012389 A1 Jan. 12, 2023

Related U.S. Application Data

(63) Continuation of application No. PCT/CN2021/117289, filed on Sep. 8, 2021.

(30) Foreign Application Priority Data

Jul. 9, 2021 (CN) ......................... 202110777171.5

(51) Int. Cl.
*B01F 35/221* (2022.01)
*B01F 23/40* (2022.01)
(Continued)

(52) U.S. Cl.
CPC .......... *B01F 35/2217* (2022.01); *B01F 23/40* (2022.01); *B01F 33/811* (2022.01);
(Continued)

(58) Field of Classification Search
CPC ........ B01F 23/40; B01F 23/405; B01F 23/45; B01F 23/452; B01F 33/811;
(Continued)

(56) References Cited

U.S. PATENT DOCUMENTS 4,436,113 A * 3/1984 Finger ............. B01F 35/718051 137/565.17
4,597,507 A * 7/1986 Rosenblum ........... G01F 11/284 222/64

(Continued)

FOREIGN PATENT DOCUMENTS

CN 101667608 A 3/2010
CN 102553489 A 7/2012

(Continued)

*Primary Examiner* — Kevin F Murphy
*Assistant Examiner* — Jonathan J. Waddy
(74) *Attorney, Agent, or Firm* — Kilpatrick Townsend & Stockton LLP

(57) ABSTRACT

A mixing apparatus includes: a driving device configured to drive first liquid to flow into first transfer chamber and to drive second liquid to flow into second transfer chamber, a first transfer chamber configured to store inflowed first liquid, and a second transfer chamber configured to store inflowed second liquid; a premixing chamber communicating with liquid outlet of first transfer chamber and liquid outlet of second transfer chamber; and a monitor configured to monitor volume of liquid in first transfer chamber and volume of liquid in second transfer chamber, close liquid inlet of first transfer chamber and control first liquid to flow into premixing chamber when volume of first liquid is equal to first value, and close liquid inlet of second transfer chamber and control second liquid to flow into premixing chamber when volume of second liquid is equal to second value.

14 Claims, 1 Drawing Sheet

(51) Int. Cl.
*B01F 33/81* (2022.01)
*B01F 35/83* (2022.01)

(52) U.S. Cl.
CPC ....... *B01F 35/833* (2022.01); *Y10T 137/2499* (2015.04); *Y10T 137/87652* (2015.04)

(58) Field of Classification Search
CPC .............. B01F 35/2217; B01F 2101/58; B01F 2215/0409; B01F 25/104; B01F 25/105; B01F 2025/919; Y10T 137/2499; Y10T 137/87643; Y10T 137/87652
USPC ....... 137/3, 4, 88, 597, 896, 897; 366/152.2, 366/152.6, 154.1, 159.1, 162.1
See application file for complete search history.

(56) References Cited

U.S. PATENT DOCUMENTS

| | | | | | |
|---|---|---|---|---|---|
| 4,812,047 | A * | 3/1989 | Baumann | G01G 19/24 366/152.2 |
| 5,792,342 | A * | 8/1998 | Heller | A61L 9/015 700/266 |
| 8,235,580 | B2 * | 8/2012 | Fanjat | H01L 21/6715 366/132 |
| 10,990,114 | B1 | 4/2021 | Miller | |
| 11,958,028 | B2 * | 4/2024 | Hayashi | B01F 35/2136 |

FOREIGN PATENT DOCUMENTS

| | | | |
|---|---|---|---|
| CN | 103041744 | A | 4/2013 |
| CN | 107029622 | A | 8/2017 |

* cited by examiner

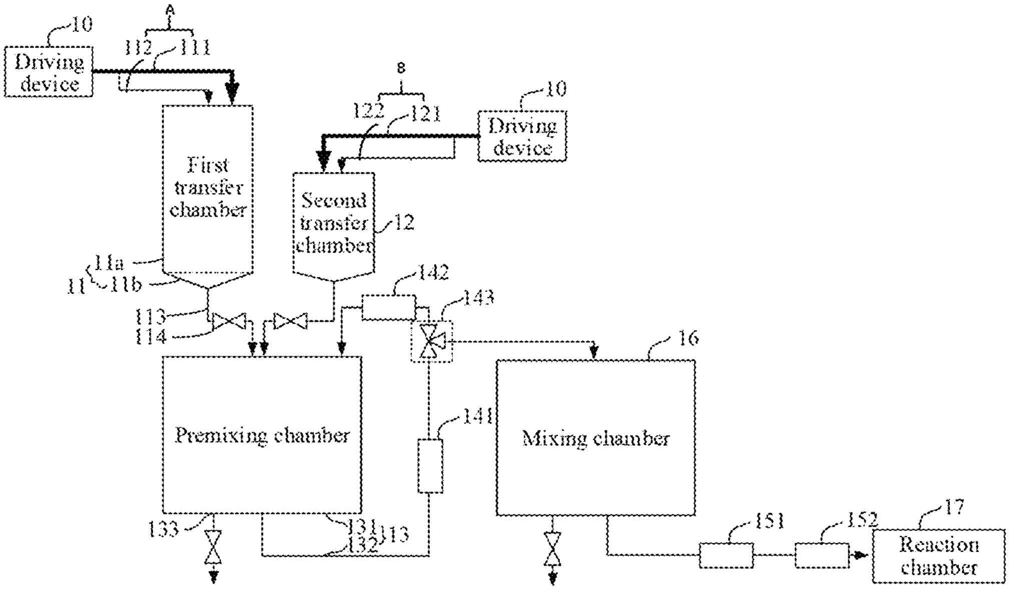
10
Driving device
A
112
111
First transfer chamber
B
122
121
10
Driving device
Second transfer chamber
12
11a
11
11b
113
114
142
143
16
Premixing chamber
141
Mixing chamber
133
131
132
13
151
152
17
Reaction chamber

MIXING APPARATUS

CROSS-REFERENCE TO RELATED APPLICATIONS

This application is a continuation application of International Patent Application No. PCT/CN2021/117289, filed on Sep. 8, 2021, which claims priority to Chinese Patent Application No. 202110777171.5, filed on Jul. 9, 2021 and entitled “MIXING APPARATUS”. The contents of International Patent Application No. PCT/CN2021/117289 and Chinese Patent Application No. 202110777171.5 are hereby incorporated by reference in their entireties.

TECHNICAL FIELD

The present disclosure relates to a mixing apparatus.

BACKGROUND

With the miniaturization of semiconductor devices, the morphology requirements of different structures in semiconductor devices are higher and higher, and the changes in the structure morphology may have a greater impact on the electrical performance of the semiconductor devices. In the process of forming the target structure, it is necessary to use solution such as etchant and cleaning agent. In order to ensure that the finally formed structure has a preset morphology, it is necessary to strictly control the precision of the concentration of the etchant and cleaning agent, so as to avoid the etchant and cleaning agent from additionally etching the structural material or not etching the structural material to be removed, that is, the liquid used to form the target structure needs to have high precision of concentration.

SUMMARY

In order to solve the above problems, the embodiments of the present disclosure provide a mixing apparatus. The mixing apparatus includes: a driving device, a first transfer chamber, and a second transfer chamber, where the driving device is configured to drive a first liquid to flow into the first transfer chamber through a liquid inlet of the first transfer chamber, the first transfer chamber is configured to store inflowed first liquid, the driving device is further configured to drive a second liquid to flow into the second transfer chamber through a liquid inlet of the second transfer chamber, and the second transfer chamber is configured to store inflowed second liquid; a premixing chamber communicating with a liquid outlet of the first transfer chamber and a liquid outlet of the second transfer chamber, where the first liquid and the second liquid are mixed in the premixing chamber to generate a premixed liquid; and a monitor, configured to monitor a volume of the liquid in the first transfer chamber and a volume of the liquid in the second transfer chamber, to close the liquid inlet of the first transfer chamber and control the first liquid in the first transfer chamber to flow into the premixing chamber when the volume of the first liquid is equal to a first value, and to close the liquid inlet of the second transfer chamber and control the second liquid in the second transfer chamber to flow into the premixing chamber, when the volume of the second liquid is equal to a second value.

BRIEF DESCRIPTION OF THE DRAWINGS

One or more embodiments are illustrated by figures in the accompanying drawings, which do not constitute a limitation to the embodiments, and elements having the same reference numerals in the drawings are denoted as similar elements, unless specifically stated, the FIGURES in the drawings do not constitute scale limitations.

FIG. 1 illustrates a functional diagram of a mixing apparatus according to an embodiment of the present disclosure.

DETAILED DESCRIPTION

In order to make the objectives, technical solutions and advantages of the embodiments in the present disclosure clearer, the following describes the embodiments of the present disclosure in detail with reference to the accompanying drawings. However, those of ordinary skill in the art will appreciate that many technical details have been proposed in various embodiments of the present disclosure for the better understanding of the present disclosure. However, the technical solutions claimed in the present disclosure may be realized even without these technical details and various changes and modifications according to the following embodiments.

FIG. 1 illustrates a functional diagram of a mixing apparatus according to an embodiment of the present disclosure.

Referring to FIG. 1, the mixing apparatus includes a driving device 10, a first transfer chamber 11, a second transfer chamber 12, a premixing chamber 13 and a monitor (not illustrated). The driving device 10 is configured to drive a first liquid to flow into the first transfer chamber 11 through a liquid inlet of the first transfer chamber 11, the first transfer chamber 11 is configured to store the inflowed first liquid, the driving device 10 is further configured to drive a second liquid to flow into the second transfer chamber 12 through a liquid inlet of the second transfer chamber 12, and the second transfer chamber 12 is configured to store the inflowed second liquid. The premixing chamber 13 communicates with a liquid outlet of the first transfer chamber 11 and a liquid outlet of the second transfer chamber 12. The first liquid and the second liquid are mixed in the premixing chamber 13 to generate a premixed liquid. The monitor is configured to monitor a volume of the liquid in the first transfer chamber and a volume of the liquid in the second transfer chamber. The monitor is configured to close the liquid inlet of the first transfer chamber 11 and control the first liquid in the first transfer chamber 11 to flow into the premixing chamber 13 when the volume of the first liquid is equal to a first value, and close the liquid inlet of the second transfer chamber 12 and control the second liquid in the second transfer chamber 12 to flow into the premixing chamber 13 when the volume of the second liquid is equal to a second value. The ratio of the first value to the second value is set according to the concentration requirement of the premixed liquid. In an embodiment, if the first liquid is a solvent and the second liquid is a solute, the higher the concentration of the premixed liquid of the first liquid and the second liquid, the smaller the ratio of the first value to the second value.

The driving device 10 for driving the first liquid and the driving device 10 for driving the second liquid may be the same driving device 10 or different driving devices 10. The driving device 10 drives the first liquid and the second liquid in a pressurized manner, and the magnitude of the pressure is determined according to a pre-determined flow rate-pressure diagram and a desired flow rate. The precision of the pressure applied by the driving device 10 is related to the driving capability of the driving device 10. The lower the driving capability of the driving device 10, the lower the precision of the pressure applied by the driving device 10, and the more the actual flow rates of the first liquid and the second liquid deviate from the preset flow rate. Furthermore, the faster the flow rate of the first liquid or the second liquid is, the more bubbles are generated due to turbulence, and the greater the deviation between the actual flow and the preset flow is.

In this disclosure, the first transfer chamber 11 is provided with a first liquid inlet 111 and a second liquid inlet 112, and a cross-sectional area of the first liquid inlet 111 is larger than a cross-sectional area of the second liquid inlet 112. The monitor is further configured to monitor a difference between the volume of the first liquid in the first transfer chamber 11 and the first value, close the first liquid inlet 111 when the difference is equal to a first preset difference, and close the second liquid inlet 112 when the difference is zero.

The liquid inlet is closed only when the volume of the first liquid is at a first value and a part of the first liquid flows into the first transfer chamber 11 during the closing of the liquid inlet. Therefore, the volume of the first liquid in the first transfer chamber 11 is generally greater than the first value after the liquid inlet is completely closed and before the liquid outlet is opened. In order to improve the precision of the volume of the first liquid in the first transfer chamber 11, the first liquid inlet 111 and the second liquid inlet 112 may be provided, and when the difference reaches the first preset difference, the first liquid inlet 111 may be closed to reduce the amount of the first liquid flowing into the first transfer chamber 11, so as to avoid that the volume of the first liquid in the first transfer chamber 11 is significantly larger than the first value due to the large amount of the inflowed first liquid in the process of closing the second liquid inlet 112. Therefore, this ensures that the volume of the first liquid in the first transfer chamber 11 approaches the first value more closely after the liquid inlet of the first transfer chamber 11 is closed, thereby improving the precision of the concentration of the premixed liquid.

In addition, the cross-sectional area of the second liquid inlet 112 may be adjusted according to the flow rate of the first liquid. For example, the larger the flow rate of the first liquid, the smaller the cross-sectional area of the second liquid inlet 112, so that the amount of the first liquid in the first liquid inlet 111 is low. Furthermore, the magnitude of the preset difference may be determined according to the closing rate of the first liquid inlet 111. The faster the closing rate of the first liquid inlet 111 is, the smaller the preset difference is, which is beneficial to shorten the inflow duration of the first liquid.

Correspondingly, in this embodiment, the second transfer chamber 12 is provided with a third liquid inlet 121 and a fourth liquid inlet 122, and a cross-sectional area of the third liquid inlet 121 is larger than a cross-sectional area of the fourth liquid inlet 122. The monitor is further configured to monitor a difference between the volume of the second liquid in the second transfer chamber 12 and the second value, close the first liquid inlet 111 when the difference is equal to a second preset difference, and close the second liquid inlet 112 when the difference is zero. Similar to the technical effect of the second liquid inlet 112, the fourth liquid inlet 122 facilitates the improvement of the precision of volume of the second liquid in the second transfer chamber 12.

It should be noted that, in order to minimize the influence of the excess first liquid and the excess second liquid on the precision of concentration of the premixed liquid, in the case where the closing duration of the second liquid inlet 112 and the closing duration of the fourth liquid inlet 122 are the same and the flow rate of the first liquid and the flow rate of the second liquid are the same, the ratio of the cross-sectional area of the second liquid inlet 112 to the cross-sectional area of the fourth liquid inlet 122 is set to be equal to the ratio of the first value to the second value, so that the ratio of the volume of the excess first liquid to the volume of the excess second liquid is equal to the ratio of the first value to the second value, thereby further improving the precision of concentration of the premixed liquid.

In some embodiments, the monitor may calculate the closing duration of the second liquid inlet 112, and close the second liquid inlet 112 before the volume of the first liquid in the first transfer chamber 11 reaches the first value, so that after the second liquid inlet 112 is completely closed, the volume of the first liquid in the first transfer chamber 11 is equal to or approaches the first value. Similarly, the closing duration of the fourth liquid inlet 122 may be calculated, which is not described in detail herein. Furthermore, in the case where the closing duration of the second liquid inlet 112 and the closing duration of the fourth liquid inlet 122 is different from each other and the flow rate of the first liquid and the flow rate of the second liquid are different from each other, the cross-sectional area of the second liquid inlet 112 and the cross-sectional area of the fourth liquid inlet 122 may be adjusted according to the actual closing duration and the flow rate, so that after the second liquid inlet 112 and the fourth liquid inlet 122 are completely closed, the ratio of the volume of the excess first liquid to the volume of the excess second liquid is equal to the ratio of the first value to the second value.

In this embodiment, the premixing chamber 13 has a warning water level which may indicate that the premixed liquid in the premixing chamber 13 is small and needs to be replenished with the premixed liquid in time. The monitor is further configured to monitor a water level of the premixing chamber 13, and open the liquid outlet of the first transfer chamber and the liquid outlet of the second transfer chamber when the water level in the premixing chamber 13 is at the warning water level and the liquid inlet of the first transfer chamber 11 and the liquid inlet of the second transfer chamber 12 are closed, so that the first liquid in the first transfer chamber 11 and the second liquid in the second transfer chamber 12 flow into the premixing chamber 13. That is, the driving device 10 drives the first liquid to flow into the first transfer chamber 11 and drives the second liquid to flow into the second transfer chamber 12. After the first transfer chamber 11 and the second transfer chamber 12 store corresponding liquids with a preset volume, the liquid inlet of the first transfer chamber 11 and the liquid inlet of the second transfer chamber 12 are closed, until the water level of the premixed liquid in the premixing chamber 13 to fall to the warning water level. If the water level of the premixed liquid in the premixing chamber 13 falls to the warning water level, the liquid outlet of the first transfer chamber 11 and the liquid outlet of the second transfer chamber 12 are opened, so that the premixing chamber 13 is replenished with the premixed liquid.

The premixed liquid may be any desired liquid, including an etching liquid and a cleaning liquid. For example, if the premixed liquid is diluted hydrofluoric acid, the first liquid may be deionized water, and the second liquid may be pure hydrofluoric acid or hydrofluoric acid with a higher concentration. Taking the first liquid as deionized water, and the second liquid as hydrofluoric acid with a concentration of 49%, if the target premixed liquid is diluted hydrofluoric acid of 50-80 ppm, the concentration fluctuation of the finally formed diluted hydrofluoric acid is 30-40 ppm when the flow fluctuation of the second liquid is 1 ml/min.

In this embodiment, the first transfer chamber 11 has an empty water level at a bottom surface of the first transfer chamber 11. The monitor is further configured to monitor a water level of the first liquid in the first transfer chamber 11, and close the liquid outlet of the first transfer chamber 11 after a preset delay period when the water level of the first liquid is at the empty water level. That is, the communication port between the first transfer chamber 11 and the premixing chamber 13 is closed after a preset delay period. When the water level of the first liquid falls to the empty water level, a part of the water droplets of the first liquid may adhere to a side wall of the first transfer chamber 11 and may move downward under the action of gravity. Therefore, closing the liquid outlet after a preset delay period helps to ensure that the first liquid in the first transfer chamber 11 completely flows into the premixing chamber 13, thereby improving the precision of concentration of the premixed liquid. The preset delay period may be set to be 30 s-90 s, for example, 45 s, 60 s, or 75 s.

Moreover, in some embodiments, the first transfer chamber 11 communicates with the premixing chamber 13 through a first liquid output pipe 113. The first liquid output pipe 113 is provided with a first liquid output valve 114. When the first liquid output valve 114 is in an off state, the first liquid output pipe 113 is turned off. When the first liquid output valve 114 is in an on state, the first liquid output pipe 113 is turned on. The monitor closes the liquid outlet of the first transfer chamber 11 by closing the first liquid output valve 114. In this case, when the water level of the first liquid in the first transfer chamber 11 falls to the empty water level, a part of the first liquid is located between the first transfer chamber 11 and the first liquid output valve 114, controlling the first liquid output valve 114 to be closed after a preset delay period is beneficial to ensure that all the first liquid flows into the premixing chamber 13, thereby improving the precision of concentration of the premixed liquid.

It should be noted that since the function of the first transfer chamber 11 and the function of the second transfer chamber 12 are the same, and the difference between their functions lies only in that the stored liquids are different from each other, all features related to the first transfer chamber 11 can be applied to the second transfer chamber 12. That is, both the features of the first transfer chamber 11 described above and the features of the first transfer chamber 11 to be described later can be applied to the second transfer chamber 12. Herein, only the first transfer chamber 11 is served as an example for description, and the corresponding features of the second transfer chamber 12 are not described again.

In this embodiment, the monitor includes a water level sensor (not illustrated) configured to monitor a water level of the first liquid in the first transfer chamber 11, and an analysis circuit (not illustrated) configured to calculate the volume of the first liquid in the first transfer chamber 11 according to a monitoring result of the water level sensor and a shape of the first transfer chamber 11. The shape of the first transfer chamber 11 refers to the shape of the inner cavity in which the first liquid is stored.

In this embodiment, the liquid outlet of the first transfer chamber 11 is located on the bottom surface of the first transfer chamber 11, so that the first liquid can be completely discharged. In some embodiments, the first transfer chamber 11 includes a cylindrical portion 11*a* and a funnel portion 11*b*. The funnel portion 11*b* is provided with a first port (not illustrated) and a second port (not illustrated), and a cross-sectional area of the first port is larger than a cross-sectional area of the second port. The funnel portion 11*b* communicates with the cylindrical portion 11*a* through the first port, and the second port serves as the liquid outlet of the first transfer chamber 11.

In this embodiment, the premixing chamber includes a main chamber 131, an outer pipeline 132 communicating with the main chamber 131 at different positions of the main chamber 131, and an inner circulation component configured to drive the premixed liquid in the main chamber 131 to flow into the outer pipeline 132. The inner circulation component controls the circulation flow of the premixed liquid to avoid condensation, aggregation or deposition of solute, which is conducive to ensure uniform and stable concentration of the premixed liquid.

In this embodiment, the premixing chamber 13 further includes a temperature controller 141 configured to measure and adjust a temperature of the premixed liquid so that the temperature of the premixed liquid is within a preset temperature range. In this way, it is beneficial to avoid the problem of performance degradation of the premixed liquid due to the temperature not meeting the requirements. In some embodiments, the temperature controller 141 is provided on the outer pipeline 132, and the temperature controller 141 adjusts only the temperature of the premixed liquid flowing into other chambers through the outer pipeline 132. In this way, not only the performance of the premixed liquid can meet the requirements, but also the performance requirements of the temperature controller 141 can be reduced. Furthermore, since the cross-sectional area of the outer pipeline 132 is smaller than the cross-sectional area of the main chamber 131, heating the premixed liquid through the outer pipeline 132 helps to ensure uniform heating of the premixed liquid, thereby ensuring uniform performance of the premixed liquid.

In this embodiment, the monitor further includes a concentration measuring circuit configured to measure a concentration of the premixed liquid at a preset position within the outer pipeline 132 and calculate a concentration difference between concentrations of the premixed liquid at the preset position measured at adjacent measurement time points. The concentration measuring circuit 142 may determine whether the concentration of the premixed liquid is uniform and stable according to the concentration difference at the adjacent time points. In some embodiments, the inner circulation component is further configured to control a flow rate of the premixed liquid through the outer pipeline 132 and acquire the concentration difference calculated by the concentration measuring circuit 142, and accelerate the flow rate of the premixed liquid through the outer pipeline 132 when the concentration difference is greater than a preset concentration difference, so that the premixed liquid in the premix chamber 13 is fully mixed, thereby making the concentration of the premixed liquid tend to be uniform and stable.

In this embodiment, the premixing chamber is further provided with a discharge port 133 configured to discharge the premixed liquid in the premixing chamber 13. The concentration measuring circuit 142 is configured to acquire a plurality of successive concentration differences. When each of the plurality of successive concentration differences is greater than a preset concentration difference, it is considered that the stability of the premixed liquid cannot meet the requirement, and the discharge port 133 is opened to discharge the premixed liquid in the premixing chamber 13. The main body for performing the operation of opening the discharge port 133 may be either a concentration measuring circuit 142 or a controller within a monitor.

In this embodiment, the mixing apparatus further includes a mixing chamber 16 having a first water level. A liquid inlet of the mixing chamber 16 communicates with a liquid outlet of the premixing chamber 13, and a liquid outlet of the mixing chamber 16 communicates with a reaction chamber 17 for feeding the premixed liquid into the reaction chamber 17 for the corresponding process. The monitor is configured to monitor the water level of the mixing chamber 16, and control the premixed liquid in the premixing chamber 13 to flow into the mixing chamber when the water level of the mixing chamber 16 is at the first water level and the concentration difference is less than the preset concentration difference. The first water level is used to indicate that the premixed liquid in the mixing chamber 16 is insufficient, and in this case, it is necessary to replenish the mixing chamber 16 with the premixed liquid from the premix chamber 13. When the water level of the premix chamber 13 is at the warning water level, the premix chamber 13 is replenished with the premixed liquid from the first transfer chamber 11 and the second transfer chamber 12. The fact that the concentration difference is smaller than the preset concentration difference indicates that the concentration stability of the premixed liquid meets the requirement and can be used for forming the semiconductor structure in the reaction chamber 17.

In addition, the mixing chamber 16 further has a second water level, and the second water level is higher than the first water level. The monitor is further configured to close the liquid inlet of the mixing chamber 16 to control the premixed liquid in the mixing chamber 16 to be in the second water level. The volume difference between the second water level and the first water level may be the amount of the premixed liquid required to form a target semiconductor structure in the reaction chamber 17. That is, each time the target semiconductor structure is formed in the reaction chamber 17, the water level of the premixed liquid in the mixing chamber 16 decreases from the second water level to the first water level, and the mixing chamber 16 is replenished with the premixed liquid.

In this embodiment, the outer pipeline 132 is provided with a diverter valve 143 having a first state and a second state. The premixed liquid flowing into the outer pipeline 132 flows back to the main chamber 131 when the diverter valve 143 is in the first state, and the premixed liquid flowing into the outer pipeline 132 flows into the mixing chamber 16 when the diverter valve 143 is in the second state. Controlling the premixed liquid in the premixing chamber 13 to flow into the mixing chamber 16 includes controlling the diverter valve 143 to be in the second state.

In some embodiments, in the flow direction of the premixed liquid in the outer pipeline 132, the temperature controller 141 is located between the main chamber 131 and the diverter valve 143. When the diverter valve 143 is in the second state, the temperature controller 141 is opened, and the temperature controller 141 heats the premixed liquid flowing into the mixing chamber 16 to a preset temperature, to ensure that the premixed liquid in the mixing chamber 16 to be used in the reaction chamber 17 has a preset performance. When the diverter valve 143 is in the first state, the temperature controller 141 is closed, and the premixed liquid flows back to the main chamber 131 at the original temperature. In this way, it is beneficial to prevent the solute volatilization of the premixed liquid in the premixing chamber 13, and to ensure the premixed liquid in the premixing chamber 13 to have a preset concentration.

In some embodiments, an end temperature controller 151 and an end concentration measuring circuit 152 are also arranged in series between the mixing chamber 16 and the reaction chamber 17. The end temperature controller 151 is configured to monitor and slightly regulate the temperature of the premixed liquid to be flowed into the reaction chamber 17. The wording “slightly” is relative to the temperature controller 141, that is, the temperature adjustment range of the end temperature controller 151 is smaller than the temperature adjustment range of the temperature controller 141. In other words, the temperature controller 141 adjusts the temperature of the premixed liquid to the preset temperature or the preset temperature range, which is beneficial to shorten the temperature adjustment duration of the end temperature controller 151, so as to ensure that the premixed liquid in the mixing chamber 16 can be fed into the reaction chamber 17 in time.

Similarly, the end concentration measuring circuit 152 is also configured to monitor the concentration of the premixed liquid and calculate the concentration difference between concentrations of the premixed liquid measured at adjacent measurement time points. If the concentration difference is greater than the preset concentration difference, the liquid inlet of the reaction chamber 17 can be closed, the discharge port of the mixing chamber 16 is opened to discharge the premixed liquid in the mixing chamber 16 and the mixing chamber 16 is replenished with the premixed liquid by the premixing chamber 13. Alternatively, the liquid outlet of the first transfer chamber 11 and the liquid outlet of the second transfer chamber 12 are opened and the discharge port of the premixing chamber 13 and the discharge port of the mixing chamber 16 are opened, so that the first liquid, the second liquid, and the premixed liquid that have flowed into the mixing apparatus are discharged, and the premixed liquid is re-mixed. That is, the machine is restarted to ensure that the precision of concentration of the premixed liquid meets the requirements.

In this embodiment, the first transfer chamber and the second transfer chamber are provided, and the volume of the first liquid in the first transfer chamber and the volume of the second liquid in the second transfer chamber are monitored by the monitor to achieve mixing of the first liquid and the second liquid with a preset volume ratio. Compared with controlling the flow rate ratio and the flow ratio of the first liquid and the second liquid by means of pressurization, mixing the premixed liquid by controlling the volume ratio is beneficial to avoid the flow rate fluctuation problem due to the poor pressure stability, the actual flow rate fluctuation problem due to the generation of air bubbles by the flow of the liquid, the instability problem in the process of improving the flow rate, and the actual flow rate fluctuation problem caused by the abnormal valve operation, so that the mixed premixed liquid has higher precision of concentration.

The driving device and the monitor both include a processor, a communication interface, and a memory. In general, the processor is configured to control the overall operation of a signal test device.

The communication interface enables the signal test device to communicate with other devices or apparatus through the network. The memory is configured to store instructions and applications executable by the processor, and to cache data (e.g. image data, audio data, voice communication data, and video communication data) to be processed or already processed by the processor and modules in the signal test device, which may be implemented by flash memory (FLASH) or Random Access Memory (RAM). It should be noted that in the embodiments of the present disclosure, if the timing task execution method is realized in the form of a software function module and sold or used as an independent product, it can also be stored in a computer-readable storage medium. Based on this understanding, the technical solution of the embodiments of the present disclosure can be embodied in the form of software products in essence or a part of the technical solution of the embodiments of the present disclosure that contributes to the related art can be embodied in the form of software products. The computer software product is stored in a storage medium and includes instructions for enabling the signal test device (which may be a personal computer, server, or network device, etc.) to perform all or part of the methods described in various embodiments of the present disclosure. The aforementioned storage media includes various media capable of storing program codes, such as U disk, mobile hard disk, Read Only Memory (ROM), magnetic disk or optical disk. Therefore, the embodiments of the present disclosure are not limited to any particular combination of hardware and software.

Accordingly, the embodiments of the present disclosure provide a computer-readable storage medium having stored thereon computer programs that when executed by the processor, perform the operations of the method corresponding to the signal test device.

Those of ordinary skill in the art can understand that the above embodiments are specific embodiments for realizing the present disclosure, and in actual applications, various changes can be made in form and details without departing from the spirit and scope of the present disclosure. Any person skilled in the art can make their own changes and modifications without departing from the spirit and scope of the present disclosure. Therefore, the protection scope of the present disclosure shall be subject to the scope defined by the claims.

The invention claimed is:

1. A mixing apparatus, comprising:

a driving device, a first transfer chamber, and a second transfer chamber, wherein the driving device is configured to drive a first liquid to flow into the first transfer chamber through a liquid inlet of the first transfer chamber, the first transfer chamber is configured to store inflowed first liquid, the driving device is further configured to drive a second liquid to flow into the second transfer chamber through a liquid inlet of the second transfer chamber, and the second transfer chamber is configured to store inflowed second liquid;

a premixing chamber communicating with a liquid outlet of the first transfer chamber and a liquid outlet of the second transfer chamber, wherein the first liquid and the second liquid are mixed in the premixing chamber to generate a premixed liquid; and a monitor, configured to monitor a volume of the first liquid in the first transfer chamber and a volume of the second liquid in the second transfer chamber, to close the liquid inlet of the first transfer chamber and control the first liquid in the first transfer chamber to flow into the premixing chamber when the volume of the first liquid is equal to a first value, and to close the liquid inlet of the second transfer chamber and control the second liquid in the second transfer chamber to flow into the premixing chamber when the volume of the second liquid is equal to a second value.

2. The mixing apparatus according to claim 1, wherein the liquid inlet of the first transfer chamber includes a first liquid inlet and a second liquid inlet, and a cross-sectional area of the first liquid inlet is larger than a cross-sectional area of the second liquid inlet, the monitor is further configured to monitor a difference between the volume of the first liquid and the first value, to close the first liquid inlet when the difference is equal to a first preset difference, and to close the second liquid inlet when the difference is zero.

3. The mixing apparatus according to claim 1, wherein the liquid inlet of the second transfer chamber includes a third liquid inlet and a fourth liquid inlet, and a cross-sectional area of the third liquid inlet is larger than a cross-sectional area of the fourth liquid inlet, the monitor is further configured to monitor a difference between the volume of the second liquid and the second value, to close the third liquid inlet when the difference is equal to a second preset difference, and to close the fourth liquid inlet when the difference is zero.

4. The mixing apparatus according to claim 1, wherein the premixing chamber has a warning water level, the monitor is further configured to monitor a water level in the premixing chamber, and to open the liquid outlet of the first transfer chamber and the liquid outlet of the second transfer chamber when the water level in the premixing chamber is at the warning water level and the liquid inlet of the first transfer chamber and the liquid inlet of the second transfer chamber are closed, so that the first liquid in the first transfer chamber and the second liquid in the second transfer chamber flow into the premixing chamber.

5. The mixing apparatus according to claim 4, wherein the first transfer chamber has an empty water level at a bottom surface of the first transfer chamber, and the monitor is further configured to monitor a water level of the first liquid in the first transfer chamber, and to close the liquid outlet of the first transfer chamber after a preset delay period when the water level of the first liquid is at the empty water level.

6. The mixing apparatus according to claim 1, wherein the monitor comprises a water level sensor configured to monitor a water level of the first liquid in the first transfer chamber, and an analysis circuit configured to calculate the volume of the first liquid in the first transfer chamber according to a monitoring result of the water level sensor and a shape of the first transfer chamber.

7. The mixing apparatus according to claim 1, wherein the liquid outlet of the first transfer chamber is located on a bottom surface of the first transfer chamber in a direction of gravity.

8. The mixing apparatus according to claim 1, wherein the premixing chamber comprises a main chamber, an outer pipeline communicating with the main chamber at different positions of the main chamber.

9. The mixing apparatus according to claim 8, wherein the premixing chamber further comprises a temperature controller configured to measure and adjust a temperature of the premixed liquid so that the temperature of the premixed liquid is within a preset temperature range.

10. The mixing apparatus according to claim 8, wherein the monitor further comprises a concentration measuring circuit configured to measure a concentration of the premixed liquid at a preset position within the outer pipeline and to calculate a concentration difference between concentrations of the premixed liquid at the preset position measured at adjacent measurement time points.

11. The mixing apparatus according to claim 10, wherein the premixing chamber is further provided with a discharge port configured to discharge the premixed liquid in the premixing chamber, the concentration measuring circuit is configured to acquire a plurality of successive concentration differences, and open the discharge port when each of the plurality of successive concentration differences is greater than a preset concentration difference.

12. The mixing apparatus according to claim 10, further comprising:

a mixing chamber having a first water level, wherein a liquid inlet of the mixing chamber communicates with a liquid outlet of the premixing chamber, a liquid outlet of the mixing chamber communicates with a reaction chamber, and the monitor is configured to monitor a water level of the mixing chamber, and to control the premixed liquid in the premixing chamber to flow into the mixing chamber when the water level of the mixing chamber is at the first water level and the concentration difference is less than a preset concentration difference.

13. The mixing apparatus according to claim 12, wherein the mixing chamber further has a second water level, the second water level is higher than the first water level, and the monitor is further configured to close the liquid inlet of the mixing chamber when the water level of the mixing chamber is at the second water level.

14. The mixing apparatus according to claim 12, wherein the outer pipeline is provided with a diverter valve having a first state and a second state, the premixed liquid flowing into the outer pipeline flows back to the main chamber when the diverter valve is in the first state, and the premixed liquid flowing into the outer pipeline flows into the mixing chamber when the diverter valve is in the second state, wherein controlling the premixed liquid in the premixing chamber to flow into the mixing chamber comprises controlling the diverter valve to be in the second state.

* * * * *